March 6, 1934.  J. B. NEIL  1,950,321
BEEHIVE
Filed May 13, 1932 3 Sheets-Sheet 1
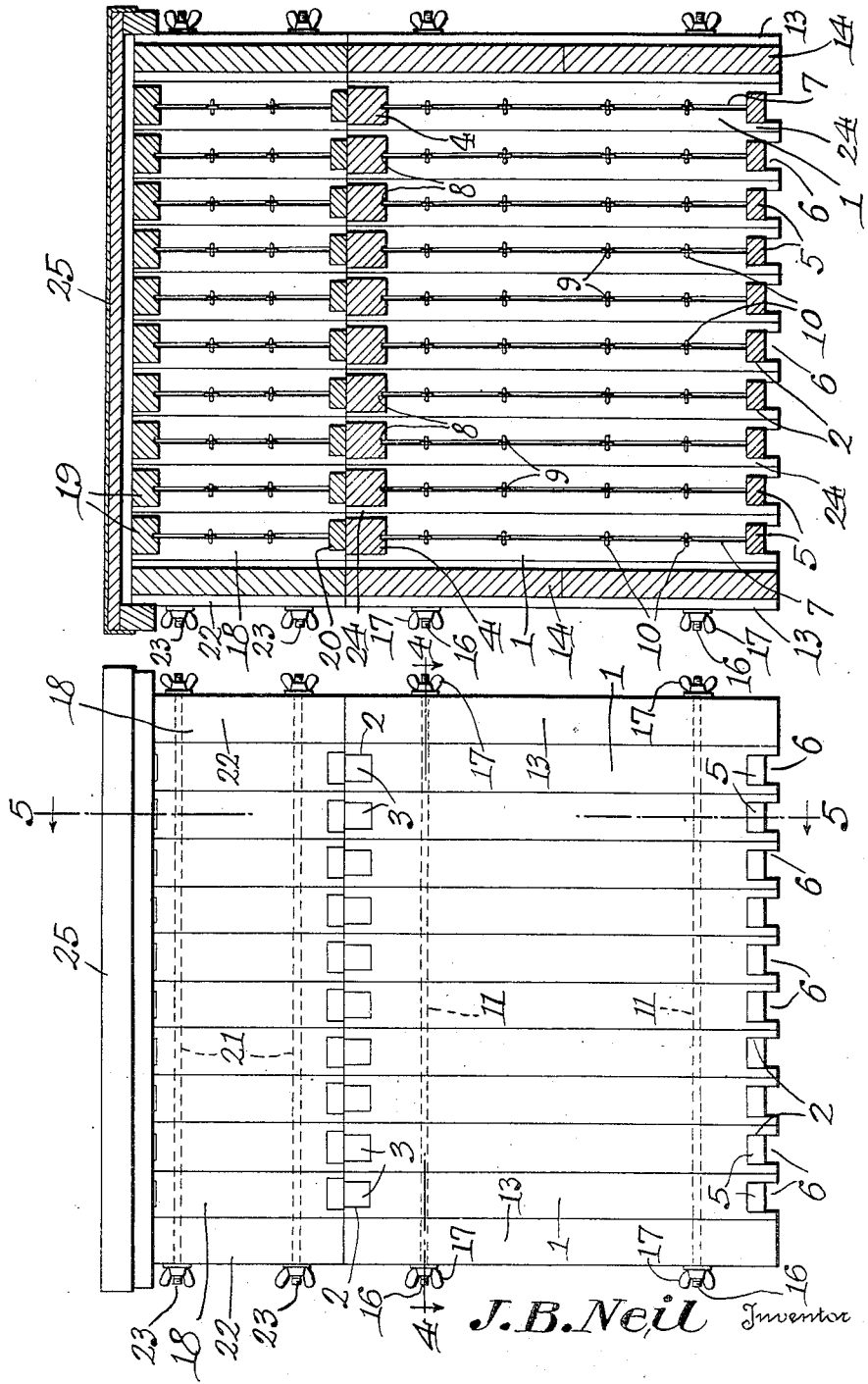
J. B. Neil Inventor
By C. A. Snow & Co.
Attorneys.

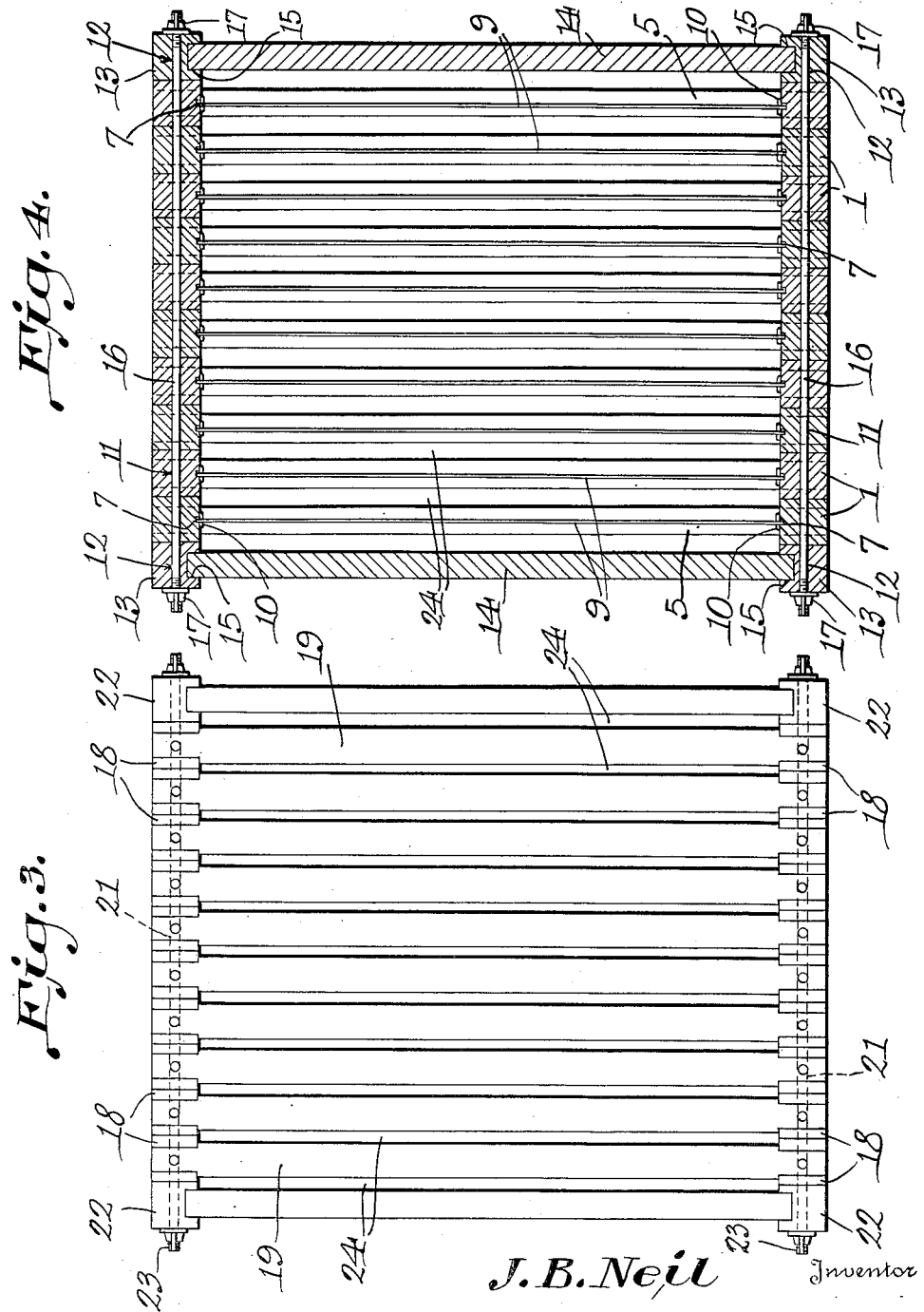

March 6, 1934. J. B. NEIL 1,950,321
BEEHIVE
Filed May 13, 1932 3 Sheets-Sheet 3
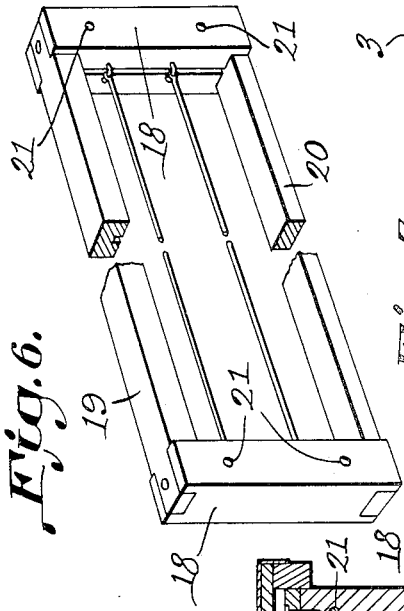
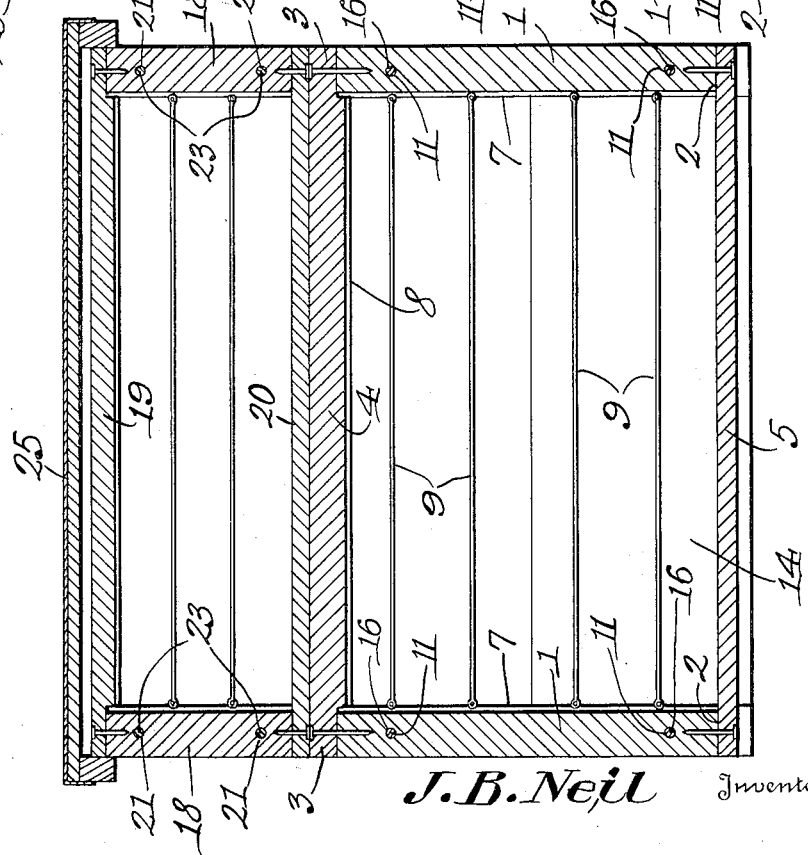
J. B. Neil Inventor
By C. A. Snow & Co.
Attorneys.

Patented Mar. 6, 1934

1,950,321

UNITED STATES PATENT OFFICE 1,950,321

BEEHIVE

Joseph B. Neil, York, S. C., assignor of one-half to F. E. Moore Lumber Co., York, S. C.

Application May 13, 1932, Serial No. 611,171

1 Claim. (Cl. 6—2)

This invention relates to bee hives, one of the objects being to provide a hive made up of a plurality of frames which can be assembled in any desired number.

A further object is to provide a hive which can be formed of strips of lumber which ordinarily would be wasted, thereby providing an outlet for this product of a sawmill and producing an added source of revenue.

Another object is to provide a hive which can be built to any length desired, the several frames constituting the hive being detachably joined but clamped together in such a manner as to prevent warping and gaping when the hive is subjected to climatic changes.

Anoter object is to provide a hive made up of frames which also constitute the honey comb frames so that it is possible to mount the foundation sheets in these frames without requiring the use of supplemental or inner frames.

A still further object is to provide simple and efficient means whereby the bees can have access readily to the spaces between all of the foundation sheets, thereby insuring uniform building of the cells throughout the internal area of the hive.

A still further object is to provide the hive with a super which can be constructed in the same manner as the hive, it being possible to erect one or more supers in superposed relation upon the hive.

In the accompanying drawings the preferred form of the invention has been shown.

In said drawings:

Figure 1 is a side elevation of a hive and super constructed in accordance with the present invention.

Figure 2 is a vertical longitudinal section therethrough.

Figure 3 is a plan view of the super.

Figure 4 is a section on line 4—4, Figure 1.

Figure 5 is a section on line 5—5, Figure 1.

Figure 6 is a perspective view of one of the frames of the super, portions being broken away.

Figure 7 is a perspective view of one of the frames of the hive, portions being broken away.

Referring to the figures by characters of reference, 1 designates the side strips of one of the frames of the hive, these strips being slotted at their ends, as shown at 2. The slots in the upper ends of the strip 1 receive tongues 3 at the ends of a top bar 4 and the slots in the lower ends of the side strips receive the ends of a bottom bar 5. This bottom bar does not extend the full depth of the bottom slots 2, consequently inlet openings are left under the ends of the bars 5 through which bees can readily enter and leave the hive.

Central longitudinal grooves 7 are formed in the inner faces of the side strips 1 and a similar groove 8 is formed longitudinally in the inner surface of the top bar 4. Cross wires 9 are arranged in the frame and are secured by any suitable means to the side strips 1. For example, these wires can be held by staples 10 straddling the grooves 7. These wires are provided for the usual purpose of supporting the foundation after it has been inserted into the frame.

Any desired number of frames can be used in the construction of the hive. The frames are all duplicates and are provided with openings 11 extending transversely through the side strips 1. When the frames are set up on end the corresponding openings aline with each other and also with openings 12 formed in the side strips 13 of end panels 14. The strips 13 are grooved longitudinally at 15 to receive the sides of the end panels.

After a desired number of frames have been assembled to form a hive of the required size, the ends of the hives are placed in position and tie rods 16 are then extended through the several alining openings. The ends of each rod are screw-threaded and are engaged by wing nuts 17 or the like. Thus by tightening these nuts the frames will be clamped together tightly and will be held positively against warping or gaping. Consequently the foundations supported within the several frames will be held properly spaced at all times so that there will be no variation in the distances between the foundations. Therefore the cells will be built up uniformly. As before stated the bees can readily enter and leave the hive through the openings 6. In cold weather these openings can be closed by laying a strip of wood therealong.

One or more supers can be mounted on the hive and these supers can be of any desired height but their construction is the same as that of the hive with the exception that no inlet openings are provided at the ends of the bottom bars. In the drawings the side strips of the frames of the super have been indicated at 18 and the top and bottom strips have been indicated at 19 and 20 respectively. The tie rods which are threaded through alining openings 21 in the strips 18 and in the side strips 22 of the end panels, have been indicated at 23.

In both the hive and the super the top and bottom strips are of less width than the side strips so that passages 24 are thus left between the top and bottom strips for the ingress and egress of the bees.

A cover 25 of the usual or any preferred structure is adapted to be placed over the hive or the uppermost super thereon.

When it is desired to remove one or more frames of the hive or super the nuts are removed from the rods at one end, the panel at said end is slid off the rods and the adjacent frame or frames are removed. Thereafter the rods can be replaced and tightened.

It is to be understood that if desired comb honey sections can be arranged within the respective frames instead of mounting a single foundation in each hive or super frame.

The term "hive" as used in the claim is to be construed as applying to either a hive or a super.

While the super has been shown with top bars spaced apart, it is to be understood that if desired these top bars can be made of the same width as the side strips so as to close the top and form the inner cover of the super. Where this construction is employed it would merely be necessary to place a sheet metal cap over the super to form the outer cover and the expense of a wood or wood and metal cover would be avoided. Should such a construction be utilized it would be employed only in the top of the upper super, should more than one super be employed.

The modification is so obvious that illustration thereof is not deemed necessary.

What is claimed is:

A hive including end panels, a series of frames interposed between the panels, each frame including side strips having bottom slots constituting inlets, top and bottom cross strips connecting the side strips, the inlets opening under the bottom strips, said frames being spaced apart along their top and bottom strips, side and top strips having central longitudinal grooves in their inner faces, a wire extending across the frame and secured in opposed grooves, and means for binding the panels and frames together at their sides and holding them detachably.

JOSEPH B. NEIL.